Feb. 21, 1939.  K. K. NAHIGYAN ET AL  2,148,243
CENTRIFUGAL CLUTCH
Filed Aug. 17, 1936

Inventors
KEVORK K. NAHIGYAN
L. V. ANDREWS
By Albert G. Blodgett
Attorney

Patented Feb. 21, 1939

2,148,243

UNITED STATES PATENT OFFICE 2,148,243

CENTRIFUGAL CLUTCH

Kevork K. Nahigyan, and L. V. Andrews, Worcester, Mass., assignors to Riley Stoker Corporation, Worcester, Mass., a corporation of Massachusetts Application August 17, 1936, Serial No. 96,338

2 Claims. (Cl. 192—105)

This invention relates to centrifugal clutches, and more particularly to clutches of the type having revolving shoes which are held outwardly by centrifugal force in frictional engagement with a surrounding cylindrical surface.

Clutches of this type as heretofore constructed comprise two cooperating members, one member having outwardly projecting radial ribs forming pockets to receive the friction shoes, and the other member having a cylindrical portion which surrounds the shoes and provides the friction surface for contact with the shoes. Considerable difficulty has been encountered with these prior clutches as a result of wear of the various parts. In particular, the radial ribs and the edges and ends of the shoes become worn rapidly, and repairs and replacements are frequently required.

It is accordingly one object of the invention to provide a centrifugal clutch which will be reliable in operation and free from excessive wear.

It is a further object of the invention to provide a friction shoe for a centrifugal clutch which will be simple and inexpensive to manufacture and adapted to operate throughout a comparatively long life of usefulness without replacement.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a longitudinal section through a centrifugal clutch, the section being taken on the line 1—1 of Fig. 2;

Figures 1, 2, 3, 4, 5:
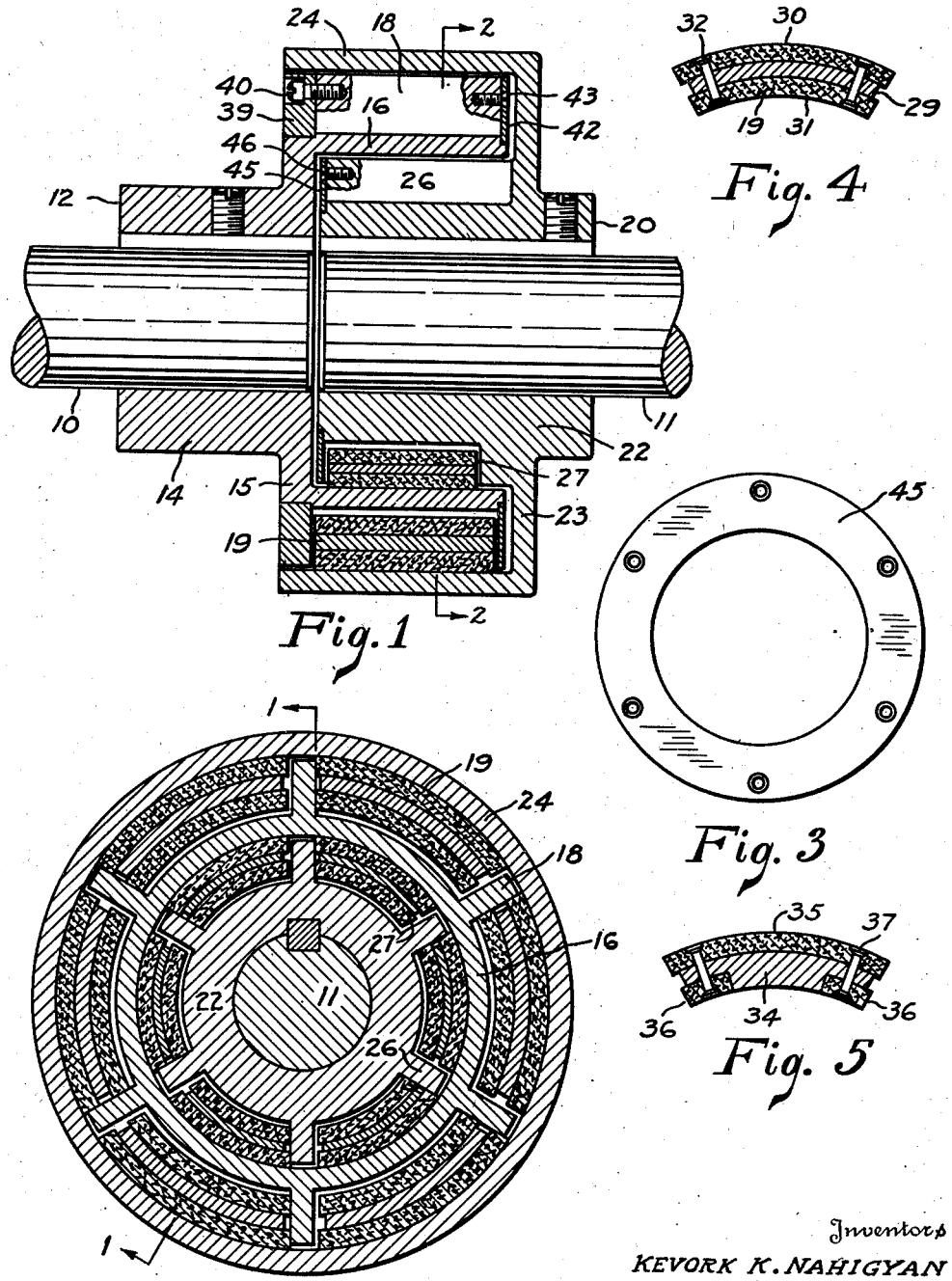
Fig. 2 is a section on the line 2—2 of Fig. 1.
Fig. 3 is a detail of an annular plate.
Fig. 4 is a section through a friction shoe.
Fig. 5 is a view similar to Fig. 4 but showing a modification.

The embodiment illustrated comprises a pair of aligned rotatable shafts 10 and 11, shaft 10 being the driver and shaft 11 the driven shaft. Secured to the driving shaft 10 is a member 12 having a hub 14, a transverse web 15 extending outwardly from the hub, and a hollow cylindrical portion 16 supported by the web and coaxial with the shafts. A series of radial ribs 18 extend outwardly from the cylindrical portion 16 to provide a plurality of pockets in each of which there is mounted a friction shoe 19. A member 20 is secured to the driven shaft 11, this member comprising a hub 22, a transverse web 23 extending outwardly from the hub, and a hollow cylindrical portion 24 supported by the web and coaxial with the shafts. The cylindrical portion 24 is located in surrounding relation to the friction shoes 19, the arrangement being such that as the driving shaft 10 is rotated the friction shoes 19 will revolve, and centrifugal force will cause the shoes to move outwardly into firm contact with the inner surface of the cylindrical portion 24, thus driving the member 20 and the shaft 11.

The hub 22 of the driven member 20 is shown provided with a series of radial ribs 26 which extend outwardly to form a plurality of pockets in each of which there is mounted a friction shoe 27. These shoes are closely surrounded at assembly by the cylindrical portion 16, and the parts are so arranged that as the driven member 20 is being brought up to speed by the action of the outer shoes 19, the inner shoes 27 will be revolved at an increasing speed, and centrifugal force will increase the pressure of the inner shoes 27 against the surrounding cylindrical portion 16. This will provide additional driving friction and increase the power which may be transmitted by the clutch without slippage.

During the operation of the clutch, an appreciable pressure exists between the friction shoes and the adjacent radial ribs, and this pressure in prior clutches has been transmitted through two contacting metal surfaces. Considerable wear on these contacting parts has been encountered. It is ordinarily necessary to use some metal in the shoes to afford the required weight and centrifugal force, but we prefer to construct the shoes in such a way that this metal will not contact with the ribs. As shown particularly in Fig. 4, each shoe 19 may comprise an arcuate metal plate 29 covered on its outer convex surface by a layer 30 of non-metallic friction material, such as molded or woven asbestos brake lining. A similar layer 31 of friction material is provided on the inner concave surface of the plate. These parts are fastened together by means of countersunk-head rivets 32. The layers 30 and 31 of friction material extend slightly beyond the edges of the plate 29 on the two opposite sides, so that the radial ribs 18 cannot engage the metal plate, and wear is greatly reduced. In case additional weight is required for the shoes they may be constructed as shown in Fig. 5, with a curved metal plate 34 having a central portion considerably greater in thickness than the edge portions. A layer 35 of friction material is mounted on the outer surface of the plate, and two narrow strips or layers 36 of friction material are applied to the inner surface of the plate adjacent the edges thereof, these parts being held together by means of countersunk-head rivets 37. The layers 35 and 36 extend beyond the edges of the plate 34 for the same purpose as in Fig. 1. It will be apparent that the inner shoes 27 may be constructed in a manner similar to the outer shoes 19.

In order to retain the outer shoes 19 in place in the assembled clutch and at the same time allow removal of these shoes without entirely disassembling the mechanism, we preferably provide an annular plate 39 (Fig. 1) which is secured to the ends of the ribs 18 by means of screws 40. This plate 39 is located in substantially the same transverse plane as the web 15, and forms a removable outward extension of this web.

We preferably provide means to prevent the outer shoes 19 from contacting at their ends with the web 23, and to prevent the inner shoes 27 from contacting at their ends with the web 15, as we believe that rubbing contact between these parts has been responsible for many of the difficulties which have been encountered with similar clutches heretofore. For this purpose we have shown an annular plate 42 fastened to the ends of the ribs 18 adjacent to the web 23 by means of screws 43, and a similar annular plate 45 fastened to the ends of the ribs 26 adjacent to the web 15 by means of screws 46. These plates form closures for the ends of the pockets in which the friction shoes rest, so that these pockets are open only in the outward direction, and only the outer surfaces of the shoes can engage relatively revolving parts.

The operation of the invention will now be apparent from the above disclosure. As the driving shaft 10 and member 14 are brought up to speed, the outer shoes 19 will move outwardly into contact with the cylindrical portion 24, and the friction between these parts will rotate the member 20 and shaft 11 at a gradually increasing speed. The inner shoes 27 will thereupon move outwardly into contact with the cylindrical portion 16, and the driven parts will continue to accelerate until the two shafts are rotating at the same speed. The driving torque is transmitted by engagement of the radial ribs 18 and 26 with the edges of the non-metallic friction material of the shoes, and even though some slippage may occur between these parts, because of misalignment of the shafts or for any other reason, the wear will be very slight. The friction shoes are prevented from moving axially in their pockets and cannot contact at their ends with relatively revolving parts. Hence the useful life of the mechanism is greatly prolonged.

Having thus described our invention, what we claim as new and desire to secure by Letters Patent is:

1. A centrifugal clutch comprising a rotatable member having a series of outwardly extending radial ribs, a series of friction shoes mounted between the ribs, each shoe including an arcuate metal plate and a layer of non-metallic friction material secured thereto, the friction material having an inner cylindrical surface engaging the outer surface of the plate and a coaxial outer cylindrical surface connected to the said inner cylindrical surface by substantially radial plane surfaces which are located slightly beyond the edges of the plate to contact with the adjacent ribs, and a second rotatable member having a hollow cylindrical portion surrounding the shoes.

2. A centrifugal clutch comprising a rotatable member having a series of outwardly extending radial ribs, a series of friction shoes mounted between the ribs, each shoe including an arcuate metal plate, a layer of non-metallic friction material secured to the outer face of the plate, the friction material having coaxial inner and outer cylindrical surfaces connected by substantially radial plane surfaces which are located slightly beyond the edges of the plate to contact with the adjacent ribs, and a second layer of non-metallic friction material secured to the inner face of the plate and shaped to provide a substantial radial plane surface which is located slightly beyond the adjacent edge of the plate, the parts being so arranged that the adjacent rib contacts with the edges of two radially spaced layers of friction material, and a second rotatable member having a hollow cylindrical portion surrounding the shoes.

KEVORK K. NAHIGYAN.
L. V. ANDREWS.

CERTIFICATE OF CORRECTION.

Patent No. 2,148,243. February 21, 1939.

KEVORK K. NAHIGYAN, ET AL.

It is hereby certified that error appears in the printed specification of the above numbered patent requiring correction as follows: Page 2, second column, line 38, claim 2, for the word "substantial" read substantially; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.